5 Sheets--Sheet 2.
D. H. RICE & J. W. MURKLAND.
Adjustable Saw-Bench.
No. 160,350. Patented March 2, 1875.
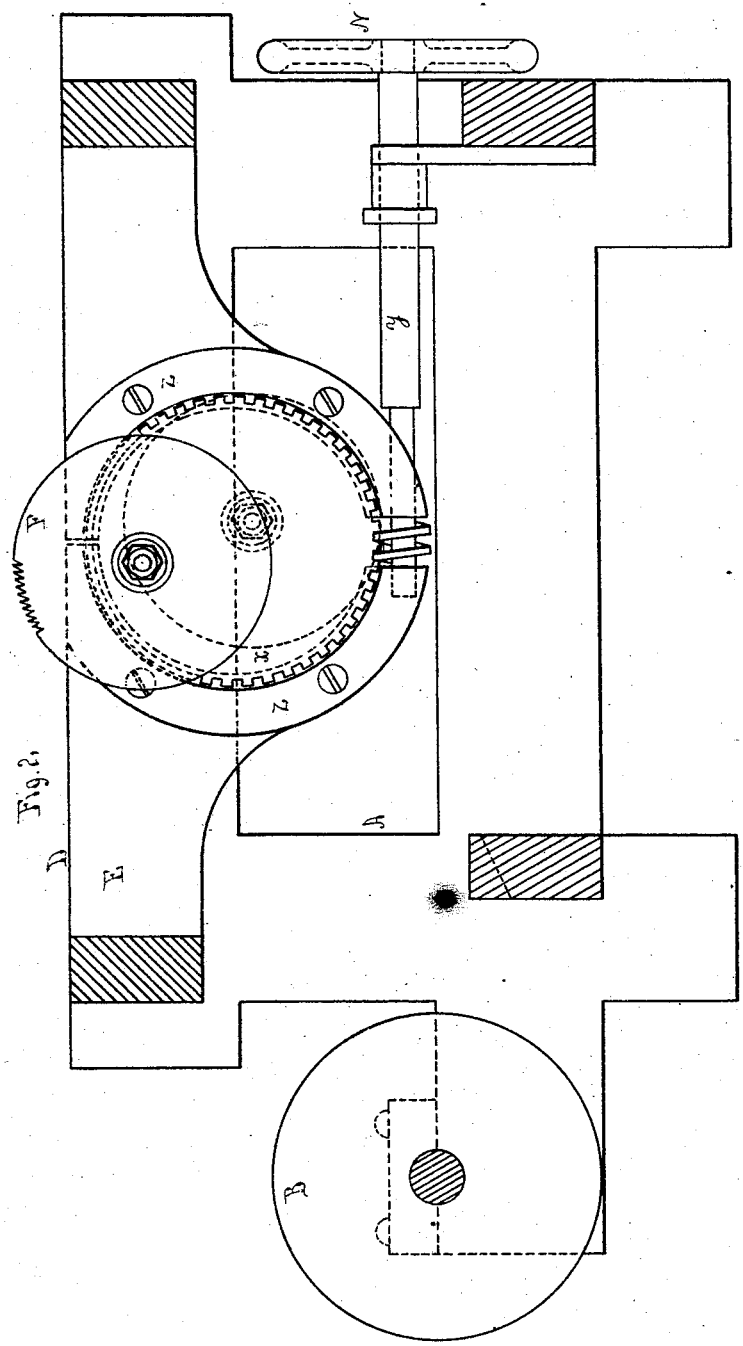

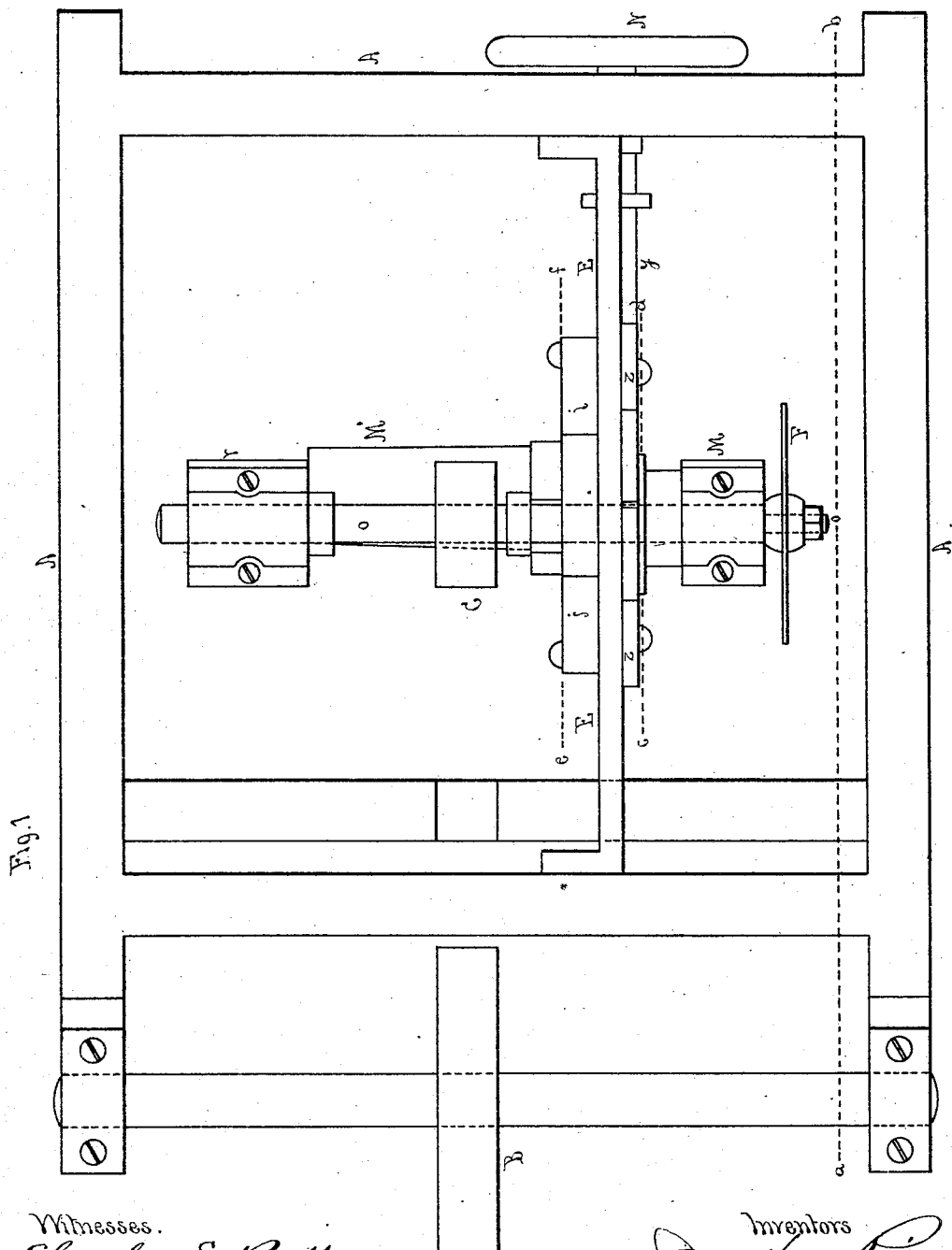

5 Sheets--Sheet 3.

D. H. RICE & J. W. MURKLAND.
Adjustable Saw-Bench,

No. 160,350. Patented March 2, 1875.

Witnesses.
Charles E. Pratt
George S. Tubman

Inventors.
D. Hall Rice
John W. Murkland

THE GRAPHIC CO. PHOTO-LITH. 39 & 41 PARK PLACE. N.Y.

5 Sheets--Sheet 4.
D. H. RICE & J. W. MURKLAND.
Adjustable Saw-Bench.
No. 160,350.
Patented March 2, 1875.
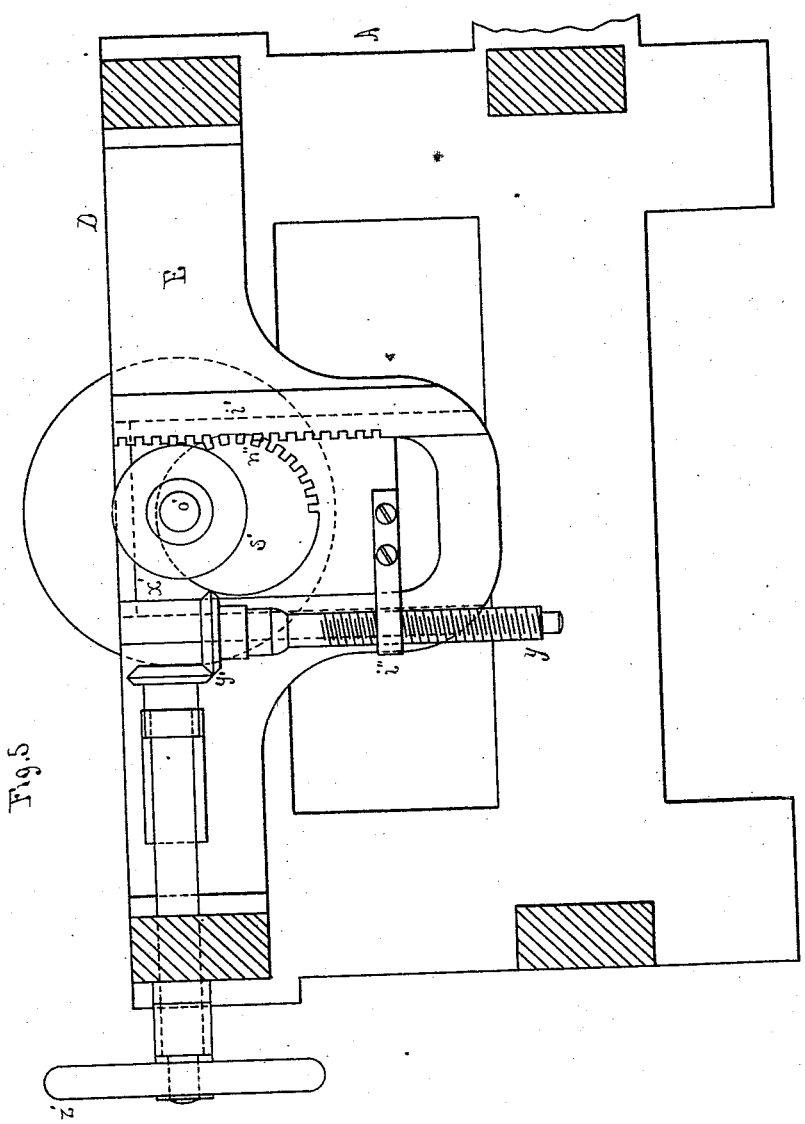
Witnesses
Charles E. Pratt
George S. Tubman
Inventors
D. Hall Rice
John W. Murkland

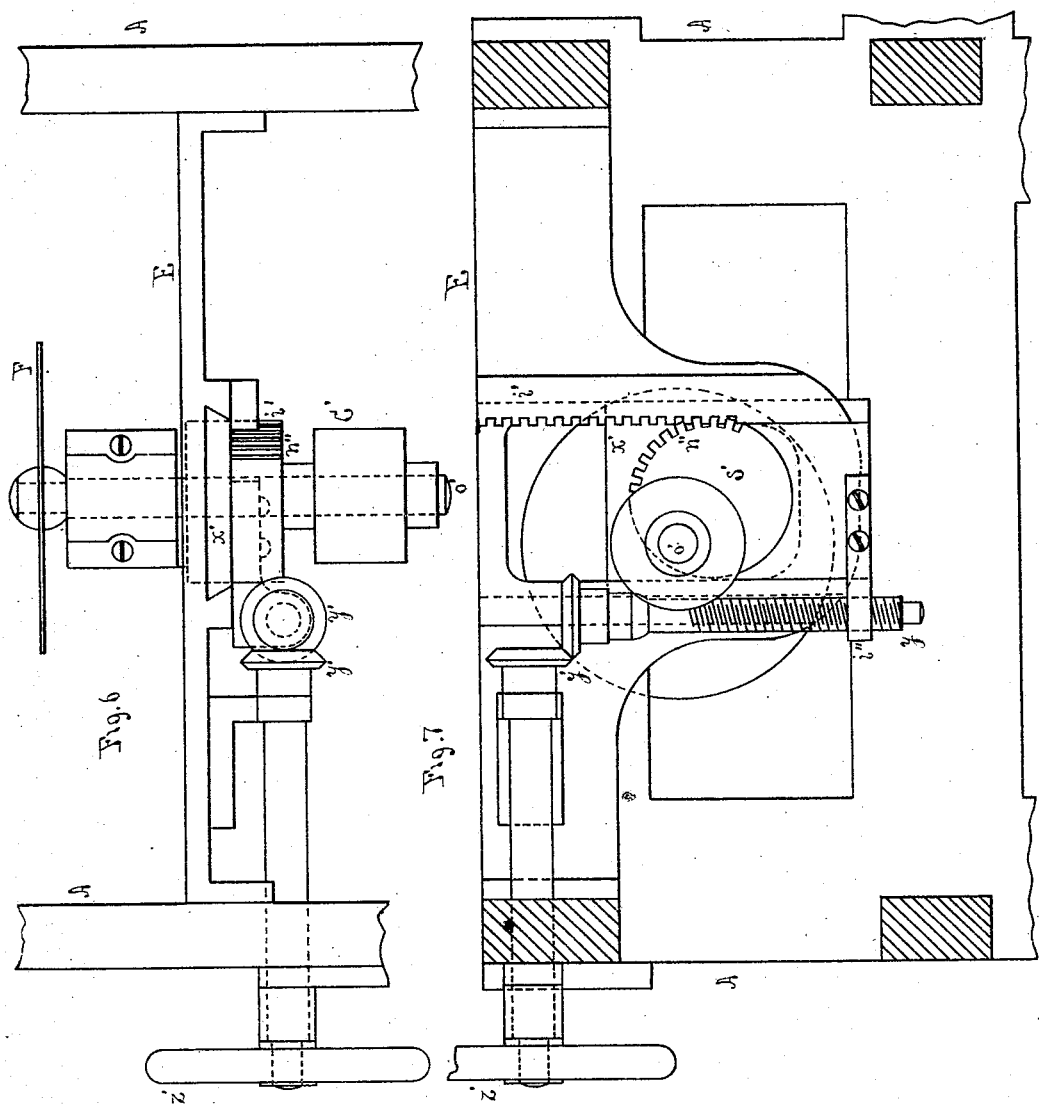

UNITED STATES PATENT OFFICE.

DAVID HALL RICE AND JOHN W. MURKLAND, OF LOWELL, MASS.

IMPROVEMENT IN ADJUSTABLE SAW-BENCHES.

Specification forming part of Letters Patent No. 160,350, dated March 2, 1875; application filed January 13, 1875.

*To all whom it may concern:*

Be it known that we, DAVID HALL RICE and JOHN W. MURKLAND, of Lowell, in the county of Middlesex and State of Massachusetts, have invented certain Improvements in Adjustable Saw-Benches, of which the following is a specification:

Our invention consists of an improved method of adjusting the saw and its mandrel and the belt-pulley, as the saw is raised and lowered with reference to the table, so that they shall traverse the arc of a circle having the counter-shaft (which is rigidly fixed) for its center, thereby keeping the tension of the belt connecting the counter-shaft, pulley, and saw-pulley always the same.

Heretofore saw-benches have been made with a slide, in which the saw-frame, carrying the saw, its mandrel, and belt-pulley, was moved up and down in a right line tangential to the arc of the circle of which the fixed counter-shaft was the center. Besides the unequal tension of the belt resulting from this construction the saw was liable to run down, as heretofore made, after the parts became worn. Another mode of hanging adjustable saws was upon arms, which swung or vibrated upon the counter-shaft at their ends opposite the saw. The great weight of the bench, necessitated by this construction, as well as the expense attending it in order to insure the solidity of the saw-frame when subjected to the back-lash of the saw in operation, have rendered it less perfect than was desirable.

In order to avoid these difficulties, and produce a lighter, perfect operating, and more durable saw-bench, our invention has been made.

We do not confine the use of our improvement to saws alone, as any kind of grooving or cutting head which is usually used in that way may be substituted for the saw upon its mandrel, and adjusted like the saw when desired in use.

Figure 4:
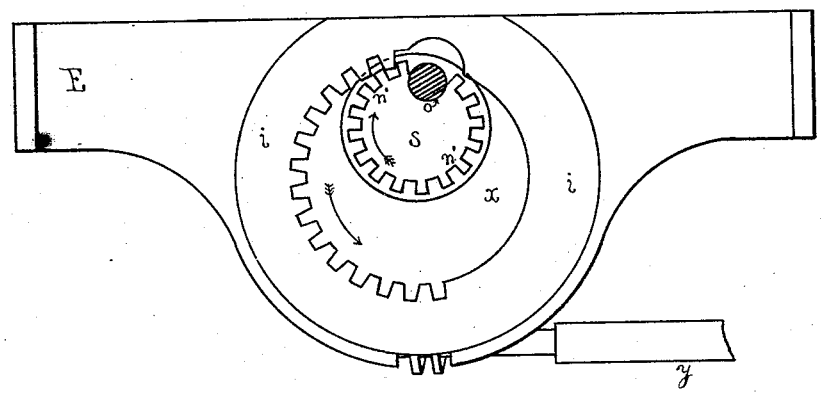
Figure 3:
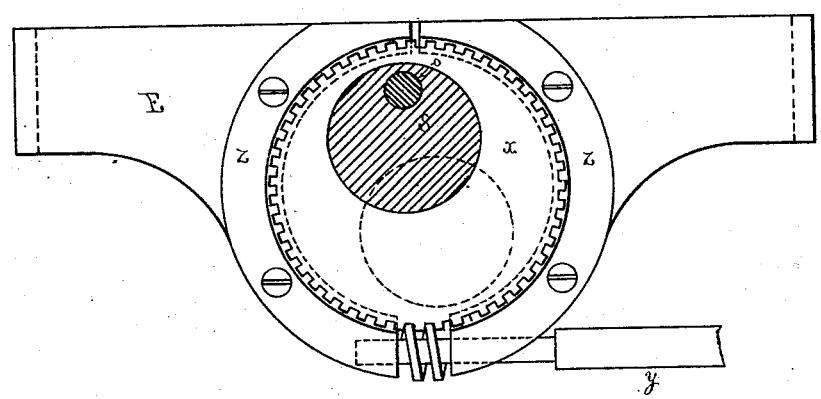

In the drawings, Figure 1 represents a top plan of our invention with the saw-table removed, showing the working parts. Fig. 2 is a vertical section on the line $a\,b$ of Fig. 1. Fig. 3 is a vertical section on the line $c\,d$ of Fig. 1. Fig. 4 is a vertical section on the line $e\,f$ of Fig. 1. Fig. 5 is a vertical section of the modification of our invention shown in the plan Fig. 6, showing the saw raised. Fig. 6 is a plan of a modification of the first part of our invention. Fig. 7 is a vertical section of Fig. 6, showing the saw lowered.

A is the frame of the saw-bench. B is the counter-shaft and pulley, which is fixed in the frame, and from which motion is given to the saw by a belt running over the pulley C. D is the surface of the table-top through which the periphery of the saw projects. E is a girt of metal bolted to opposite sides of the frame, which serves to support the saw and its raising and lowering mechanism. Through the widest part of the girt E a circular hole is cut or made as large as a circular disk of metal, $x$, and the disk $x$ is fitted in this hole, and held in place within the girt E by means of overlapping segments Z Z, which fit into a groove in the circumference of the disk. The disk $x$ is fitted accurately to the segments Z Z, so as to be capable of revolving freely around upon them, and it has a worm-gear cut in its outer circumference. The segments Z Z are bolted solidly to the girt E. Into a worm-gear upon the edge of the disk $x$ a worm upon a horizontal shaft, $y$, is fitted, and the shaft $y$ is prolonged beyond the frame of the bench, and has a hand-wheel, N, attached to its outer end in a position convenient to the hand of the operator. The shaft $y$ being secured to the frame of the bench, the disk $x$ may be revolved by the hand-wheel N to any desired position. Through the disk $x$ on one side of its center a circular hole is cut of about half the size of the disk. In this hole is fitted accurately the small disk S. This disk S is made in two parts, overlapping the opposite faces of the disk $x$ slightly, to hold it in place, and these parts are bolted together through the hole in the disk $x$. The disk S is fitted so as to revolve smoothly and freely in the disk $x$. Through one edge of the disk S a hole is made for the saw-mandrel $o$ to pass through and on the opposite faces of the disk S the boxes are secured in which the mandrel $o$ revolves, the box M being secured directly to one face of the disk S, and the box $r$ attached to its opposite face by an arm, M'. The part of the disk S to which the arm M' is attached extends beyond the face of the disk $x$, and has a gear, $n'$, cut in it, concentric with the disk S. This gear $n'$ is cut away on one side by the saw-mandrel $o$ passing through it. On the opposite face of the girt E from the segments Z Z is bolted a ring, $i$, having an internal gear cut in it, as shown in Fig. 4, fitted to mesh with the gear $n'$ where the disk $x$ is revolved, and the disk S carried around with it. The pulley C is secured to the mandrel $o$, as shown in Fig. 1, and the saw F is secured to the other end of the mandrel. The relative proportions of the disks $x$ and S being properly arranged, and of the worm-gear on the disk $x$ and the gear S being also properly constructed, and the saw-mandrel $o$ being also placed at the proper point in the disk S, the machine is ready for operation. By means of the hand-wheel the disk $x$ is rotated in the direction of the arrow shown upon it in Fig. 4, and as it carries the disk S around and downward with it the gear $n'$ upon the latter meshes with the gear $i$, and the disk S is caused to rotate in the opposite direction, as shown by the arrow upon it, at a sufficient rate of speed to cause the mandrel $o$ to traverse the arc of a circle downward, the center of which is the counter-shaft B, and the belt which connects the pulleys B C is thus kept at a uniform tension, no matter what position the saw may be in. The worm-gear on the shaft $y$ holds the disk $x$ at right angles to the pressure of the saw upon it, so that it is impossible to move the disks $x$ or S from any position in which they are held by the worm without revolving the latter, and the adjustment of the saw is always positive and perfect.

Figs. 5, 6, and 7 represent a modification of our invention. Fig. 6 is a plan, and Figs. 5 and 7 vertical sections.

$x'$ is a slide, moving up and down by means of a screw, $y$, which is stationary, and which passes through a nut, $i''$, attached to the slide $x'$. The screw $y$ is revolved by the bevel-gears $y$ and the hand-wheel $Z'$. The slide $x'$ is formed of a plate of metal, fitted in vertical grooves, and has a circular hole cut through it, in which the disk $S'$ is secured so as to revolve smoothly and freely. Upon one face of the disk $S'$ projects the gear-wheel $n''$, concentric with the disk, and the stationary rack $i'$ is secured to the girt E, so as to mesh with the gear-wheel $n''$ as the slide $x$ rises and falls. The saw-mandrel $o$ passes through the disk $S'$, and revolves in boxes upon the opposite faces of the latter. The saw-mandrel passes through the upper edge of the disk $S'$, when the slide $x$ is at its highest elevation, as in Fig. 5, and the screw $y$ being properly proportioned to the gear $n''$ as the slide $x$ is lowered by the screw, the gear $n''$ continually moves the disk $S'$ around and carries the saw-mandrel away from the counter-shaft pulley, which is attached to the frame to the right of the saw, in a similar position to that shown in Fig. 1, so as to cause the saw mandrel to traverse the arc of a circle, the center of which is the counter-shaft, thus keeping the same tension of the belt on the pulley $C'$. In this modification the slide $x'$ performs similar functions in raising and lowering the disk $S'$ as the large disk $x$ performs to the disk S, while the revolving disks S and $S'$ in each case serve to keep the saw-mandrel in its proper path, and preserve the equal tension of the belt.

What we claim as new, and our invention, is—

The combination of the disk $x$, by which the saw is raised and lowered, with the revolving disk S and mandrel $o$, substantially as described.

D. HALL RICE.
JOHN W. MURKLAND.

Witnesses:
GEORGE S. TUBMAN,
CHARLES E. PRATT.